United States Patent
Guionneau et al.

(10) Patent No.: US 12,506,799 B2
(45) Date of Patent: Dec. 23, 2025

(54) METHOD AND SYSTEM FOR DEPLOYING A SAAS APPLICATION

(71) Applicant: BULL SAS, Les Clayes-sous-bois (FR)

(72) Inventors: Christophe Guionneau, Grenoble (FR); Jean-Christophe Durieu, Montbonnot-Saint-Martin (FR)

(73) Assignee: BULL SAS, Les Clayes-sous-Bois (FR)

( * ) Notice: Subject to any disclaimer, the term of this patent is extended or adjusted under 35 U.S.C. 154(b) by 90 days.

(21) Appl. No.: 18/604,941

(22) Filed: Mar. 14, 2024

(65) Prior Publication Data
US 2024/0314196 A1   Sep. 19, 2024

(30) Foreign Application Priority Data
Mar. 16, 2023 (EP) .................................. 23305365

(51) Int. Cl.
*H04L 67/1001* (2022.01)
*H04L 9/40* (2022.01)

(52) U.S. Cl.
CPC .......... *H04L 67/1001* (2022.05); *H04L 63/08* (2013.01)

(58) Field of Classification Search
None
See application file for complete search history.

(56) References Cited

U.S. PATENT DOCUMENTS

| 2020/0257700 A1* | 8/2020 | Xu ........................ G06F 16/213 |
| 2022/0329651 A1 | 10/2022 | Kim | |
| 2023/0171254 A1* | 6/2023 | Guionneau ......... H04L 63/0884 726/5 |
| 2023/0216841 A1* | 7/2023 | Guionneau ............. H04L 67/02 726/8 |
| 2024/0340220 A1* | 10/2024 | Dukes ..................... H04L 67/10 |

OTHER PUBLICATIONS

European Search Report and Written Opinion issued in EP23305365.1 on Aug. 10, 2023 (11 pages).

* cited by examiner

*Primary Examiner* — June Sison
(74) *Attorney, Agent, or Firm* — ARC IP Law, PC; Joseph J. Mayo

(57) ABSTRACT

The invention relates to a method for deploying a software as a service (SaaS) application, in particular an authentication as a service (IDaaS) application. The method includes deploying a load distribution module, provided for receiving the connections to the application, and distributing the connections within a group of application nodes, each executing an instance of the application and being provided to perform at least one connection to the application. The method also includes deploying at least one master application node, and at least one iteration of of adjusting, by a master application node, the number of application nodes in the group based on an index representative of the total load of the application nodes of the group. The invention also relates to a computer program and a system implementing such a method.

13 Claims, 3 Drawing Sheets

METHOD AND SYSTEM FOR DEPLOYING A SAAS APPLICATION

This application claims priority to European Patent Application Number 23305365.1, filed 16 Mar. 2023, the specification of which is hereby incorporated herein by reference.

BACKGROUND OF THE INVENTION

Field of the Invention

At least one embodiment of the invention relates to a method for deploying a SaaS application, and in particular an identification as a service (IDaaS) application. It also relates to a system implementing such a method.

The field of the one or more embodiments of the invention is the field of applications proposed in SaaS mode, and in particular the field of deploying such applications.

Description of the Related Art

Companies increasingly use "as a service" applications hosted in the cloud, called SaaS applications in the present application. Access to these applications is managed by a user identification service, which can also be proposed in the form of a SaaS application, generally called identification as a service, or IDaaS. An IDaaS application, or service, comprises a user management component enabling the administration, by administrators, of user access rights, and an access management component enabling authentication of users and administrators.

The deployment of a SaaS application must address a variable number of connections that depends on several parameters: numbers of users, nature of the application, authentication frequency, re-authentication frequency, etc. Thus, the architecture for deploying a SaaS application must be capable of responding to connection peaks and offering a high availability of the SaaS application, being capable of dealing with large loads, while optimizing the resources used for its deployment and the cost of the infrastructure.

Various solutions are currently known for the deployment of an application in SaaS mode. A first solution consists in using a reverse proxy, but this solution leads to a privacy failure and is not usable for all applications, and in particular for an IDaaS application. Another solution consists in using a rotating DNS resolution, for example using the Round Robin DNS principle, but this solution is expensive and does not allow service continuity with an effective load distribution. Another solution is to perform multi-tenant deployment with oversizing of capacities, but this solution is expensive and has security weaknesses.

One aim of at least one embodiment of the invention is to solve at least one of the above-mentioned shortcomings.

Another purpose of at least one embodiment of the invention is to propose a solution for deploying a SaaS application, and in particular an IDaaS application, which is more flexible, less expensive, offering high availability of the application and efficient load management.

BRIEF SUMMARY OF THE INVENTION

At least one embodiment of the invention makes it possible to achieve at least one of the aforementioned aims with a method for deploying a software as a service (SaaS) application, in particular an identity-as-a-service (IDaaS) application, said method comprising the following steps:

deploying a load distribution module, provided for receiving the connections to said application, and distributing said connections within a group of application nodes, each executing an instance of said application and being provided to perform at least one connection to said application, and deploying at least one master application node;

said method further comprising at least one iteration of a step of adjusting, by a master application node, the number of application nodes in said group based on an index, called the load index, representative of the total load of the application nodes of said group.

In other words, one or more embodiments of the invention proposes to deploy a load distribution module that is intended to receive all the connections, or connection requests, to the SaaS application from the users: this allows security continuity for each connection. This also allows continuity of service, since when a new connection is assigned to an application node, the latter ensures and maintains continuity of service for said connection. The architecture obtained is a single-tenant architecture.

In addition, the load distribution module realizes the link between the users and the application nodes: it is therefore not necessary for the application nodes to be accessible to the users. Thus, it is possible not to use a public IP address for the application nodes, which reduces the cost of the infrastructure because public IP addresses are very expensive. Moreover, since they are not accessible to external users, the application nodes are not subject to malicious actions.

Above all, the number of application nodes used to deploy the application is adjusted according to a load index of the group of application nodes running the SaaS application. Thus, it is possible to increase or decrease the quantity of nodes used to deploy the application on the fly, in a dynamic, reactive and flexible manner. The deployed architecture is therefore always adjusted based on the load to be managed, which makes it possible to optimize costs for the deployment of the SaaS application.

In the present document, "node" refers to any type of virtual or physical machine, unit or container capable of executing a SaaS application, and in particular an IDaaS application. Preferably, a node may be a virtual machine.

"Application node" refers to a node executing an instance of the deployed SaaS application and capable of managing one or more connections to said SaaS application.

"Master application node" is understood to mean an application node configured to have the ability to add or delete an application node, called slave application node, to/from the group of application nodes executing the SaaS application.

"Slave application node" refers to an application node created by another application node, called master application node, and which does not have the ability to add or delete an application node.

The term "load index" is understood to mean a metric informing the application load of an application node, or of a group of application nodes, that is, the ratio between the application load executed by said node and the total application capacity of said node.

The load index of an application node can be determined in the following way, for a given SaaS application. The cost of each type of operation proposed for said SaaS application can be determined by taking into account the CPU/memory/network load necessary to perform said type of operation. When the cost of each type of operation is known, the total load of an application node can be calculated by adding the costs of all the operations ensured by the application node. Since the total capacity of said application node is known in terms of CPU/memory/network, it is then possible to calculate the load index for said node.

The load index of the group of application nodes can be calculated according to the individual load indices of the application nodes forming said group. For example, the group's load index may be an average of the individual load indices.

According to at least one embodiment, the load index of the group of application nodes may be equal to the load index of a master application node. Indeed, in at least one embodiment of the invention, the connections are distributed among several application nodes by the distribution module. Therefore, it is highly probable that the distribution of the connections is statistically equal for each of the application nodes. Thus, it is statistically highly probable that the load index of the group of application nodes is equal to the individual load index of a master application node.

The adjustment step may comprise a step of adding, by a master application node, a slave application node when the value of the load index exceeds a predetermined high threshold.

Thus, when the processing load of the application nodes increases and exceeds an upper limit, a new slave node is added to the group of application nodes to deploy the SaaS application. This makes it possible to offer a high availability of the SaaS application with better load management.

It should be noted that the addition of the slave application node is carried out by a master node, and not by another component of the infrastructure. Thus, the or each master node has an overall view of all of the deployed application nodes for deployment of the SaaS application.

When there are multiple master nodes, a master node adding a slave node may report the addition of said slave node to the other master nodes so that each master node has a view of all of the application nodes.

According to one or more embodiments, the step of adding a slave node may comprise the following steps:
creating the slave application node by an orchestration module on request from the master application node,
starting an instance of the application on said slave node,
transmitting an internal IP address of said slave node to said load distribution module, and
adding said slave node to a list of application nodes held by said load distribution module.

The slave node's IP address may preferably be an internal IP address and not a public IP address.

According to one or more embodiments, the transmission of the IP address of the slave node to the load distribution module can be carried out by the slave node itself. Alternatively, preferably, the transmission of the IP address of the slave node to the load distribution module can be carried out by the master node. In this case, the latter receives the IP address of the slave node and transmits it to the load distribution module.

Of course, other information relating to the slave node can be transmitted to the load distribution module, such as for example an identifier or a name of said slave node.

According to one or more embodiments, but in no way limitingly, the added slave node may have a power, and in particular a power in terms of CPU/memory/network, greater than or equal to the master node having added it.

Thus, the risks of power deficit will be reduced. Indeed, deploying slave nodes with a power equal to or greater than that of the master node makes it possible to ensure that the load index calculated by a master node, based on its own power, will be appropriate or at least will cause no power deficit.

The adjustment step may comprise a step of deleting, by a master application node, a slave application node when the value of the load index falls below a predetermined low threshold.

Thus, at least one embodiment of the invention makes it possible to downwardly adjust the size of the deployment infrastructure of the SaaS application when the load related to said deployment decreases, for example because the number of connections to said application decreases. This reduces the cost related to the deployment of the SaaS application.

When there are multiple master nodes, a master node deleting a slave node may signal the deletion of said slave node to the other master nodes so that each master node has a view of all of the application nodes.

According to one or more embodiments, the method may comprise a step of validating the deletion of the slave node. Such a validation step ensures that the deletion of the slave node will not affect the deployment of the SaaS application.

According to one or more embodiments, the validation step may comprise the following steps:
calculating the projected value of the load index, after deleting said slave node,
if the calculated projected value remains below the low threshold, confirming the deletion of the slave node.

Thus, at least one embodiment of the invention ensures that the deletion of the slave node does not cause the group of application nodes to be overloaded or nearly overloaded. The slave node is not deleted if the projected load index after deletion of said slave node remains greater than the low threshold.

The projected load index after deletion can be calculated by keeping the current application load to a total resource amount decreased by that of the slave node to be deleted.

According to one or more embodiments, the step of deleting a slave node may comprise the following steps:
removing said slave node from a list of application nodes held by said load distribution module, so that said slave node does not receive any new connection,
continuing, by said slave node, connections already established at the time of the removal step, and
when said application node no longer has any established connection to the application, stopping said slave node, The list of application nodes may be the list mentioned above, held by the load distribution module, and enabling said load distribution module to know the application nodes to which it can direct the requests to connect to the SaaS application. This list mentions the exhaustive list of the application nodes between which the load distribution module distributes the requests to connect to the SaaS application.

The removal of a slave node is preferably requested by the master node, or one of the master nodes, by indicating the name or an identifier or else the internal IP address of said slave node.

The method according to at least one embodiment of the invention may comprise an update of the load index based on the number of connections.

In particular, the load index can be updated by one or each master module based on the number of connections managed by said master module. For example, in at least one embodiment, the master module may update the load index each time said master module receives a new connection assigned to it, and/or each time the master module ends an ongoing connection. In this case, the master module does not see the other connections managed by the other master or slave application nodes. However, since the distribution is carried out equally between the application nodes, the global load index is similar or equal to the load index of the, or of each, master node, on the condition that all nodes have the same processing power.

At least one adjustment step, namely a step of adding a slave application node or a step of deleting a slave application node, can be carried out according to the current value of the load index.

Alternatively, or in addition, at least one adjustment step, namely a step of adding a slave application node or a step of deleting a slave application node, can be carried out based on a projected or expected value, or an estimated value, of the load index.

The method according to one or more embodiments of the invention may comprise a step of estimating an estimated, or corrected, value of the load index depending on:
- a current value of said load index, and/or
- a variation of said load index over a past time window, and in particular immediately preceding the current instant, denoted to, for example a time window of 30 seconds before instant to and/or
- a value previously stored for the current time slot, or a future time slot, or a past slot.

The calculation of the corrected or estimated value of the load index can be carried out by any known mathematical relationship.

The calculation of the corrected or estimated value of the load index can be carried out for a future instant, or for the current instant.

For example, the method according to at least one embodiment of the invention may comprise a historization of the load index over a predetermined past period, or a past time slot.

The predetermined past period may be a period of 30 seconds, or a minute, immediately preceding the current instant, denoted to.

The historization makes it possible to know, among other things, the variation of the load index, optionally the speed of the variation and/or the acceleration of said variation. Thus, it is possible to estimate a value of said load index at a future instant, such as for example at $t_0+30$ seconds or $t_0+60$ seconds. The adjustment of the number of application nodes can be carried out based on said estimated value.

In addition, the method according to at least one embodiment of the invention may comprise storing the value of the load index on one or more time slots, such as for example time slots at the start of the day, at the end of the day, during the week or on the weekend.

In this case, the estimation of the value of the load index can further be carried out based on said values stored for this or that time slot.

According to one or more embodiments, a single master node can be deployed. In this case, the or each adjustment step is carried out by said master application node, in particular in turn.

According to one or more embodiments, the method a may comprise a deployment of several master application nodes. In this case, each of said master nodes can be configured to perform an adjustment step so that each master node can upwardly or downwardly adjust the number of application nodes to deploy the SaaS application. Preferably, the master nodes can be configured so that a single adjustment step is implemented at a time. For example, when a master node is preparing to implement an adjustment step, it notifies the other master nodes, which are prohibited from implementing an adjustment step as long as the one in progress is not finished.

The or each master node may communicate with another component of the infrastructure using the APIs of this component that are communicated thereto, for example at the time of creation of the master node or at the time of creation of said component. Thus, the master node communicates with:
- the orchestrator by using the APIs of said orchestrator which are communicated,
- the or each other master node using the APIs of said other master node,
- the load distribution module using the APIs of said load distribution module, and
- the or each slave node using the APIs of said slave node.

Similarly, a slave node communicates with the master node using the APIs of said master node that are communicated thereto during its creation.

According to at least one embodiment of the invention, a computer program is proposed comprising computer instructions, which when executed by a computer, implement the steps of the method according to one or more embodiments of the invention.

The computer program can be in machine language, in C, C++, JAVA, Python, and more generally any type of computer language.

The computer program can be a single program, or a set of several programs communicating together.

According to at least one embodiment of the invention, a system is proposed for deploying an application as a service (SaaS), in particular an authentication as a service (IDaaS) application, said system comprising:
- an orchestrator,
- a load distribution module, and
- at least one master application node;

configured to implement the steps of the method according to one or more embodiments of the invention.

Of course, the system according to one or more embodiments of the invention can further comprise, in terms of technical means, any combination of the features described above with reference to the method according to at least one embodiment of the invention and which are not mentioned herein for brevity.

BRIEF DESCRIPTION OF THE DRAWINGS

Other benefits and features shall become evident upon examining the detailed description of at least one embodiment, and from the enclosed drawings wherein.

DETAILED DESCRIPTION OF THE INVENTION

It is clearly understood that the one or more embodiments that will be described hereafter are by no means limiting. In particular, it is possible to imagine variants of the one or more embodiments of the invention that comprise only a selection of the features disclosed hereinafter in isolation from the other features disclosed, if this selection of features is sufficient to confer a technical benefit or to differentiate the one or more embodiments of the invention with respect to the prior state of the art. This selection comprises at least one preferably functional feature which lacks structural details, or only has a portion of the structural details if that portion only is sufficient to confer a technical benefit or to differentiate the one or more embodiments of the invention with respect to the prior state of the art.

In the figures, the same reference has been used for the features that are common to several figures.

Figure 1:
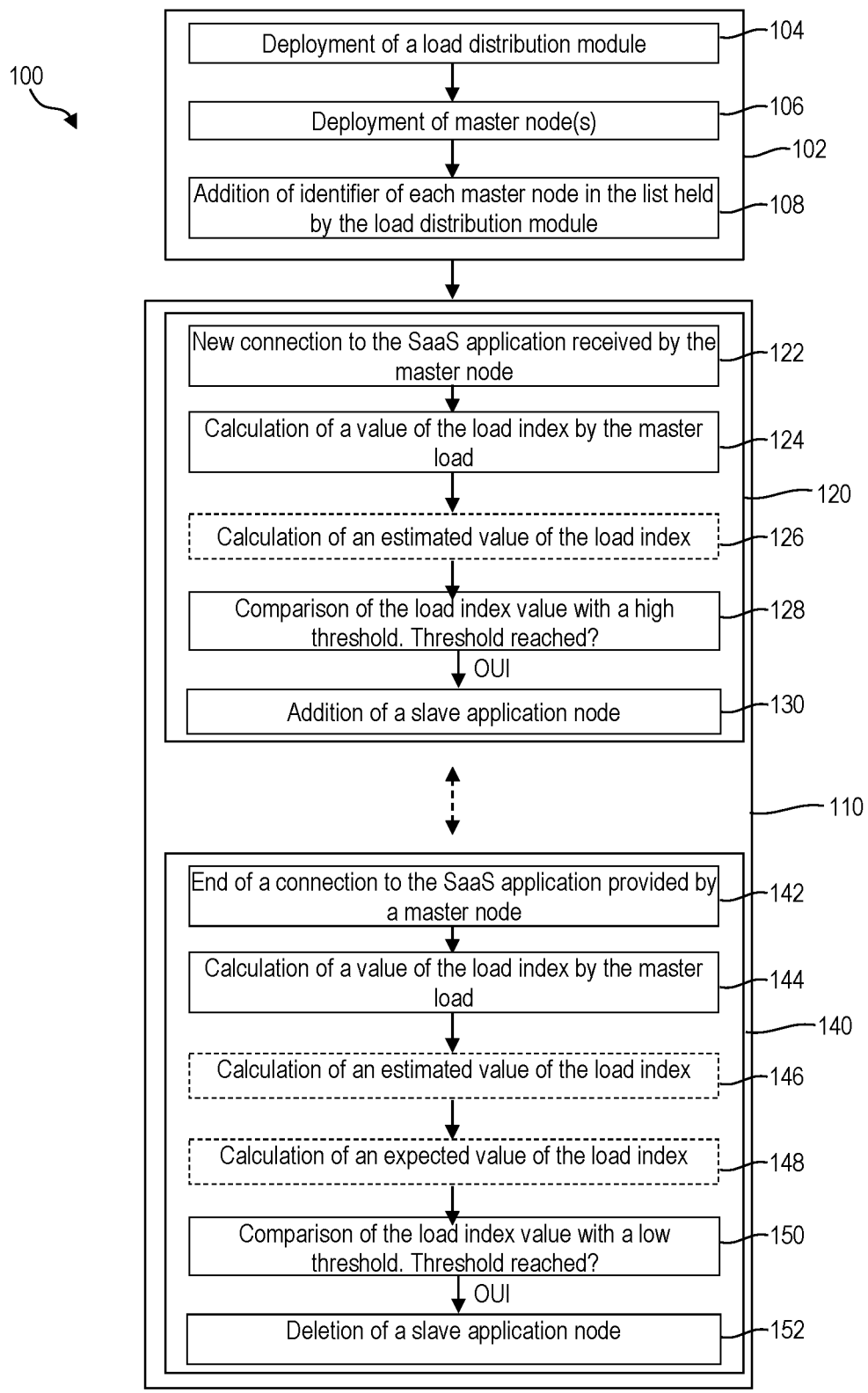
FIG. 1 is a schematic depiction of a method according to one or more embodiments of the invention.

FIG. 1 is a schematic depiction of a method according to one or more embodiments of the invention.

The method 100, shown in FIG. 1, can be implemented to deploy, within an infrastructure, an application in SaaS mode. In particular, the method 100 can be used to deploy an authentication as a service application, called an IDaaS application.

The method 100 comprises a preliminary phase 102 of starting the basic components for deployment of the SaaS application.

The preliminary phase 102 comprises a step 104 of deployment, within the infrastructure, of a load distribution module, also called load balancer in the following. The load balancer is used to receive connection requests to the SaaS application. To do this, the load balancer comprises a public IP address that can be used by the users, or user devices, to transmit a connection request to the SaaS application. The load balancer can be deployed manually by an operator. Alternatively, the load balancer can be deployed semi-automatically, or automatically, by an orchestrator.

The load balancer may be a physical machine. Preferably, the load balancer is a virtual machine.

The load balancer holds a list of application nodes, each executing an instance of the SaaS application, and provided for receiving and processing the connections to the SaaS application.

The preliminary phase 102 further comprises a step 106 of deploying, within the infrastructure, at least one master application node, and in particular several, for example two, master application nodes.

An Internet IP address is assigned to each master application node, also called master node hereinafter.

Preferably, the master application nodes are identical.

Each master node includes an instance of the SaaS application and can receive and process one or more connections to the SaaS application.

Each master node comprises a management module configured to:
calculate and update a load index,
trigger the addition of a slave application node, also called slave node, and
trigger the deletion of a slave application node.

The or each master node may be a virtual machine.

The or each node computes and updates a load index representative of the load of all of the application nodes to deploy the SaaS application.

The or each master node may hold a list of the slave nodes to deploy the SaaS application.

The or each master node may be deployed by an orchestrator of the infrastructure, for example.

During a step 108, the internal IP address, and optionally an identifier, such as a name, of the or of each master node is transmitted to the load distribution module, which stores it in the list of application nodes.

At the end of the preliminary phase 102, the SaaS application is deployed and the connections to the application can begin to be processed by the master node(s).

After the preliminary phase 102, the method 100 comprises a phase 110 for processing the connections to the SaaS application. During this phase 110, each new connection request is received by the load distribution module, which allocates it to one of the application nodes indicated in the list that said load distribution module holds.

On startup, the list only includes one or more master nodes. Then, gradually, one or more slave nodes are created when the load increases, and are added to the list. When the load decreases, one or more slave nodes are deleted from the list. Thus, the number of application nodes in the list held by the load distribution module varies and adapts to the load.

The phase 110 of processing the connections may comprise one or several load increase phases 120 during which the number of connections to the SaaS application increases. In this case, the load to be processed also increases and can justify an increase in the number of application nodes, to avoid an overload of the application nodes already deployed that can cause a service outage, or a service slowdown.

The load increase phase 120 may comprise an addition of a slave node by a master node, in particular when the load increase is significant. The addition of a slave node can be done in the following way.

During a step 122, a master node receives a new connection to the SaaS application, to be processed by said master node.

During a step 124, the master node calculates or updates a load index based on the number of connections it manages, the cost of each connection in terms of CPU/memory/networks and its processing capacity in terms of CPU/memory/networks. Statistically, the load index of the master node corresponds to the average load index of all of the application nodes that manage the connections to the SaaS application. Indeed, the load distribution module performs a balanced distribution of the connections among the application nodes listed in the list that it holds. Thus, each of the application nodes statistically has a same load index.

During an optional step 126, the master node may calculate an estimated, or corrected, value of the load index based on the value provided by step 124 and:
a variation, that is, a speed of variation or a variation acceleration, of the load index over a time window immediately preceding the current instant, denoted to, for example a time window of 30 seconds before instant to; and/or
a value previously stored for the current time slot, or the next time slot.

The calculation of the corrected or estimated value of the load index can be carried out by any known mathematical relationship.

During a step 128, the value of the load index calculated in step 124, or in step 126, is compared to a high threshold representative of an overload. The high threshold may for example be 80%.

If the high threshold is not reached, no action is taken.

If the high threshold is reached, then the method 100 comprises a step 130 of adding a slave application node by the master node. This slave node is then added in the list held by the load distribution module and can receive the connections to the SaaS application.

Preferably, a slave node added by a master node has a data processing capability, in terms of CPU/memory/network, equal to or greater than said master node.

A non-limiting example of a step 130 of adding a slave node is described with reference to FIG. 2, according to one or more embodiments of the invention.

Thus, steps 122-130 can be repeated as many times as desired to add one or more slave application nodes to accompany the load increase.

The phase 110 of processing the connections may comprise one or several load decrease phases 140 during which the number of connections to the SaaS application decreases. In this case, the load to be processed also decreases and can justify a reduction in the number of application nodes, to prevent the application nodes already deployed from being under load.

The load decrease phase 140 may comprise a deletion of a slave node already deployed by a master node, in particular when the load decrease is significant. The deletion of a slave node can be done in the following way.

During a step 142, a connection processed by a master node ends.

During a step 144, the master node calculates, or updates, a load index based on the number of remaining connections it manages, the cost of each connection in terms of CPU/memory/networks and its processing capacity in terms of CPU/memory/networks. Statistically, the load index of the master node corresponds to the average load index of all of the application nodes that manage the connections to the SaaS application. Indeed, the load distribution module performs a balanced distribution of the connections within the application nodes listed in the list that it holds. Thus, it can be considered that each of the application nodes statistically has a same load index.

During an optional step 146, the master node may calculate an estimated, or corrected, value of the load index based on the value provided by step 144 and:
- a variation, that is, a speed of variation or a variation acceleration, of the load index over a time window immediately preceding the current instant, denoted to, for example a time window of 30 seconds before instant to; and/or
- a value previously stored for the current time slot, or the next time slot.

The calculation of the corrected or estimated value of the load index can be carried out by any known mathematical relationship.

During an optional step 148, a projected value of the load index can be calculated by considering the deletion of a slave node, based on the capacity of said slave node and on the value of the load index calculated in step 144 or 146.

During a step 150, the value of the load index calculated in step 144, or in step 146 or in step 148, is compared to a low threshold representative of a sub-load. The low threshold may for example be 30%.

If the value of the load index is not less than or equal to the low threshold, then no action is made.

If the value of the load index is less than or equal to the low threshold, then the method 100 comprises a step 152 of deleting an application node by the master node. This slave node is then deleted from the list held by the load distribution module and cannot receive the connections to the SaaS application.

A non-limiting example of a step 152 of deleting a slave node is described with reference to FIG. 3, according to one or more embodiments of the invention.

Steps 142-152 can be repeated as many times as desired to delete one or more slave application nodes to accompany the load decrease.

Figure 2:
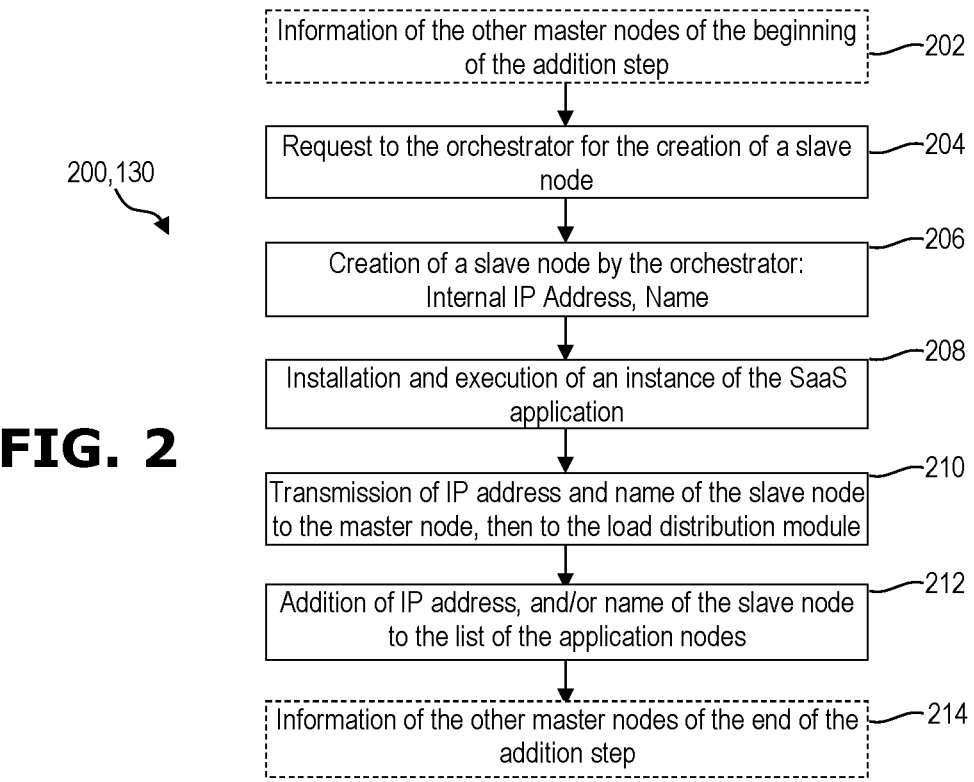
FIG. 2 is a schematic depiction of a step for adding a slave application node that can be implemented in the method according to one or more embodiments of the invention.

FIG. 2 is a schematic depiction of a non-limiting exemplary embodiment of a step for adding a slave node that can be implemented in a method according to one or more embodiments of the invention.

Step 200 of FIG. 2 can be step 130 of FIG. 1, according to one or more embodiments of the invention.

Step 200 is carried out to deploy and add a slave application node to a group of application nodes ensuring the deployment of a SaaS application.

Step 200 is carried out for example when the measured, or estimated, load index exceeds a high threshold.

Step 200 is triggered by a master application node.

Step 200 comprises an optional step 202 during which the master node communicates with the other master nodes to warn them of the beginning of step 200 for adding a new slave node. Thus, the other master nodes are blocked from creating or deleting a slave node as long as step 200 of creating a node, in progress, is not complete.

Step 200 comprises a step 204 during which the master node communicates with an orchestrator, using the orchestrator APIs that are communicated to it at the time of its creation, to request the creation of a slave application node.

During a step 206, the orchestrator creates the slave application node, for example with the same technical parameters as the master node, or with parameters previously defined for the creation of a slave node. These parameters can be stored in a configuration file stored at the master node or at the orchestrator. In all cases, the created slave node has a capacity greater than or equal to the master node that requested its creation, in terms of CPU/memory/network.

When it is created, the slave node is assigned an internal IP address, and optionally a name. It also receives APIs to communicate with the master node that requested its creation.

During a step 208, an instance of the SaaS application is installed and started on the slave node. This step may for example be carried out by the slave node.

During a step 210, the IP address and the name of the slave node are communicated, by the slave node, to the master node, which transmits said IP address and the name to the load distribution module. Optionally, the master node stores the IP address and the name of the slave node locally.

During a step 212, the load distribution module registers the IP address and the slave node identifier on the list of application nodes deploying the SaaS application. From this moment, the slave node may receive the connections to the SaaS application.

During an optional step 214, the master node notifies the other nodes that the step of adding a slave node is complete, and optionally sends them the IP address and/or the name of the slave node that has just been created. Optionally, the master node or nodes update the number of slave nodes.

Figure 3:
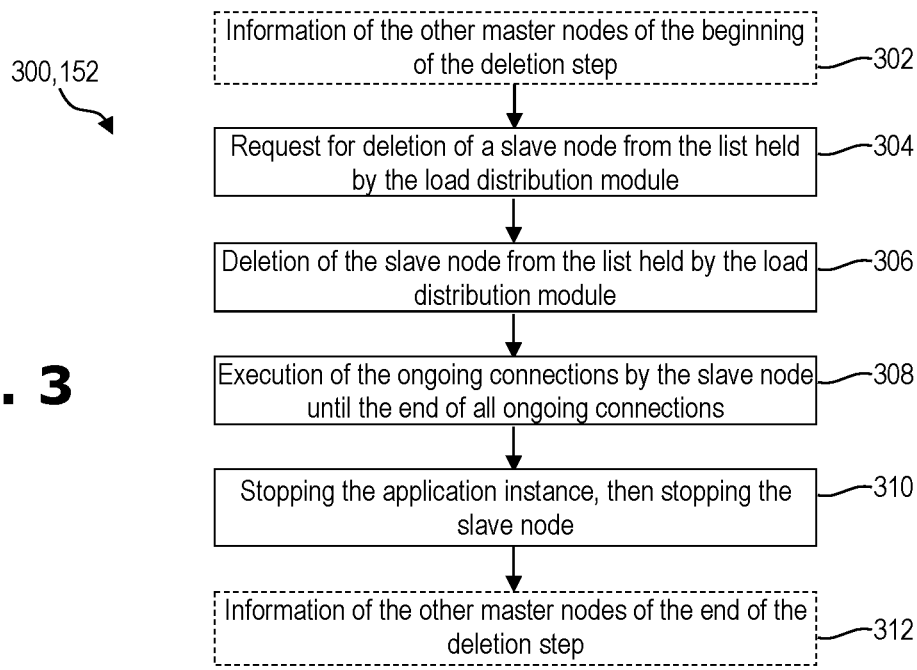
FIG. 3 is a schematic depiction of a step for deleting a slave application node that can be implemented in the method according to one or more embodiments of the invention.

FIG. 3 is a schematic depiction of a step for deleting a slave node that can be implemented in a method according to one or more embodiments of the invention.

Step 300 of FIG. 3 can be step 152 of FIG. 1, according to one or more embodiments of the invention.

Step 300 is carried out to delete a slave application node from a group of application nodes ensuring the deployment of a SaaS application, in particular during a load decrease phase.

Step 300 is carried out for example when the measured, or estimated, load index falls below a low threshold.

Step 300 is triggered by a master application node.

Step 300 comprises an optional step 302 during which the master node communicates with the other master nodes to warn them of the beginning of step 300 for deleting a slave node. Thus, the others are blocked from creating or deleting a slave node as long as step 300 of deleting a node is not complete.

Step 300 comprises a step 304 during which the master node communicates with the load distribution module, using the APIs of the load distribution module that are communicated to it at the time of its creation, to request the deletion of a slave application node from the list of application nodes that said distribution module holds.

During a step 306, the load distribution module deletes the name and/or the IP address of the slave node from the list of application modules that it holds. Thus, the slave node in question no longer receives new connections to the SaaS application.

During a step 308, the slave node continues to ensure the connections that had been assigned to it before step 306, until all of the connections that it had been responsible for have been switched off. This slave application node does not receive new connections, so that after a moment this slave node no longer provides any connection to the SaaS application.

When all the connections provided by the slave node are terminated, then the slave node informs the master node, deletes the instance of the SaaS application, and then stops, during a step 310. The resources associated with this slave node can be destroyed or paused.

During an optional step 312, the master node notifies the other nodes that the step of deleting a slave node is complete. Optionally, the master node or nodes update the number of slave nodes.

Figure 4:
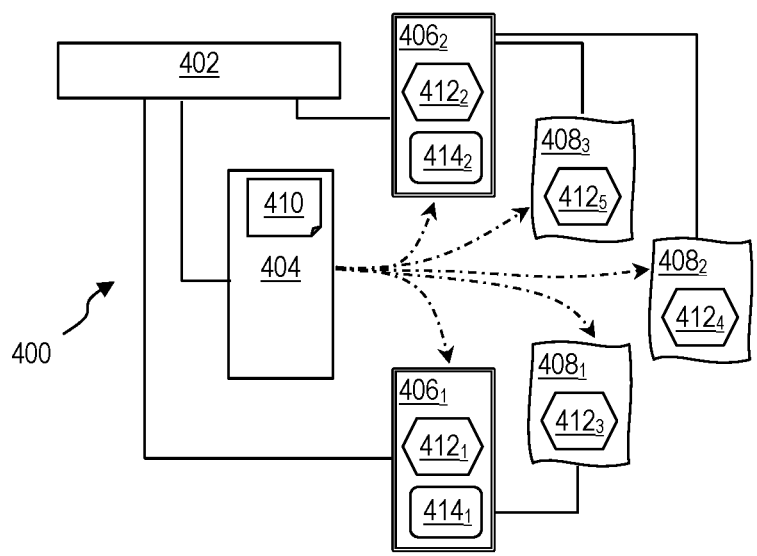
FIG. 4 is a schematic depiction of a system according to one or more embodiments of the invention.

FIG. 4 is a schematic depiction of a system according to one or more embodiments of the invention.

The system 400 of FIG. 4 can be used to implement a method according to at least one embodiment of the invention, and in particular the method 100 of FIG. 1, according to one or more embodiments of the invention.

The system 400 comprises an orchestrator 402, a load distribution module 404 and one or more master application nodes 406. In the example shown, in a non-limiting manner, the system 400 comprises two master nodes $406_1$ and $406_2$.

The system 400 may further comprise one or more slave application nodes 408, added by the master node(s) 406 during the operation of the system, that is, during the deployment of the SaaS application. In the example shown, in a non-limiting manner, the system 400 comprises three slave nodes $408_1$-$408_3$.

The load distribution module 404 and each master node 406 can be created by the orchestrator 402.

The load distribution module 404 keeps a list 410 up to date of application nodes processing the connections to the SaaS application. In the example shown in FIG. 4, this list indicates the two master nodes $406_1$, $406_2$ and the three slave nodes $408_1$, $408_2$ and $408_3$.

Each master node $406_1$ and $406_2$ executes an instance of the SaaS application, respectively $412_1$, $412_2$. Each master node $406_1$ and $406_2$ comprises a management module, respectively $414_1$ and $414_2$, configured to:
- calculate and update a load index,
- trigger the addition of a slave application module, and
- trigger the deletion of a slave application node.

Each slave node 408 executes an instance of the SaaS application, respectively $412_3$-$412_4$.

Preferably, the master nodes are identical, but they may be different.

Preferably, the slave nodes are identical, but they may be different.

Preferably, each of the nodes is a virtual machine.

The number of master nodes is not limited to two and is greater than or equal to 1.

The number of slave nodes is not limited to three and is greater than or equal to 0.

Of course, these examples are only given by way of specific examples and the at least one embodiment of the invention is not limited to the examples given above. Numerous variants can be envisaged for the examples given above without departing from the scope of the invention as defined in the main claims.

The invention claimed is:

1. A method for deploying a software as a service (SaaS) application, comprising an identification as a service (IDaaS) application, via a computer comprising a central processing unit (CPU) configured to implement said method comprising:
    deploying a load balancer, provided to
        receive connections to said SaaS application, and
        distribute said connections within a group of application nodes, each application node of said group of application nodes executing an instance of said SaaS application and being provided to perform at least one connection of said connections to said SaaS application;
    deploying at least one master application node of said group of application nodes;
    at least one iteration of adjusting, by a master application node of said at least one master application node, a number of application nodes in said group of application nodes based on a load index, wherein the load index is representative of a total load of the group of application nodes.

2. The method according to claim 1, wherein the adjusting comprises adding, by said master application node, a slave application node from said group of application nodes when a value of the load index exceeds a predetermined high threshold.

3. The method according to claim 2, wherein said adding said slave application node comprises
    creating the slave application node by an orchestrator on request from the master application node,
    starting said instance of the SaaS application on said slave application node,
    transmitting an internal IP address of said slave application node to the load balancer, and
    adding said slave application node to a list of application nodes held by said load balancer.

4. The method according to claim 3, wherein the slave application node comprises a computing power greater than or equal to the master application node that added said slave application node.

5. The method according to claim 1, wherein said adjusting comprises deleting, by said master application node, a slave application node when a value of the load index drops below a predetermined low threshold.

6. The method according to claim 5, further comprising validating the deleting of the slave application node comprising
    calculating a projected value of the load index, after said deleting said slave application node, if the projected value that is calculated remains below the predetermined low threshold, confirming the deleting of the slave application node.

7. The method according to claim 5, wherein said deleting said slave application node comprises removing said slave application node from a list of application nodes held by said load balancer, such that said slave application node does not receive any new connection, continuing, by said slave application node, the connections already established at a time of said removing, and when said slave application node no longer has any established connection to the SaaS application, stopping said slave application node.

8. The method according to claim 7, further comprising updating the load index based on a number of connections.

9. The method according to claim 1, further comprising estimating an estimated or corrected value of the load index based on one or more of a current value of said load index;

a variation of said load index over a past time window immediately preceding a current instant;

a value previously stored for a current time slot, or a future time slot, or a past time slot.

10. The method according to claim 1, further comprising historization of the load index over a predetermined past period, or a predetermined past time slot.

11. The method according to claim 1, further comprising deploying several master application nodes, wherein said adjusting comprises a single adjustment being implemented by any one of said at least one master node at a time.

12. A non-transitory computer program comprising computer instructions, which when executed by a computer comprising a central processing unit (CPU), implement a method or deploying a software as a service (SaaS) application, comprising an identification as a service (IDaaS) application, wherein said computer comprising said CPU is configured to implement said method comprising:

deploying a load balancer, provided to receive connections to said SaaS application, and distribute said connections within a group of application nodes, each application node of said group of application nodes executing an instance of said SaaS application and being provided to perform at least one connection of said connections to said SaaS application;

deploying at least one master application node of said group of application nodes;

at least one iteration of adjusting, by a master application node of said at least one master application node, a number of application nodes in said group of application nodes based on a load index, wherein the load index is representative of a total load of the group of application nodes.

13. A system that deploys a software as a service (SaaS) application, comprising an identification as a service (IDaaS) application, said system comprising:

one or more computers comprising a central processing unit (CPU) to implement an orchestrator, a load balancer, and at least one master application node;

wherein said system configured to implement a method comprising deploying said load balancer, provided to receive connections to said SaaS application, and distribute said connections within a group of application nodes, each application node of said group of application nodes executing an instance of said SaaS application and being provided to perform at least one connection of said connections to said SaaS application;

deploying said at least one master application node of said group of application nodes;

at least one iteration of adjusting, by a master application node of said at least one master application node, a number of application nodes in said group of application nodes based on a load index, wherein the load index is representative of a total load of the group of application nodes.

* * * * *